United States Patent [19]
Hammarström et al.

[11] Patent Number: 6,044,142
[45] Date of Patent: Mar. 28, 2000

[54] METHOD AND ARRANGEMENT FOR INTEGRATING INTELLIGENT NETWORK SERVICES WITH OPERATOR ASSISTED SERVICES

[75] Inventors: Peter Hammarström, Sandviken, Sweden; Jan H. I. Lindeberg, Nivaa; Allan Smidt, DK-Broenshoej, both of Denmark

[73] Assignee: Telefonaktiebolaget L M Ericsson, Stockholm, Sweden

[21] Appl. No.: 08/851,898

[22] Filed: May 6, 1997

[51] Int. Cl.[7] .................................................... H04M 7/00
[52] U.S. Cl. .......................... 379/223; 379/265; 379/207
[58] Field of Search .................................... 379/223, 265, 379/266, 309, 201, 207, 203, 218, 210, 211, 229, 230

[56] References Cited

U.S. PATENT DOCUMENTS

| | | | |
|---|---|---|---|
| 4,677,588 | 6/1987 | Benjamin et al. | 709/228 |
| 4,797,910 | 1/1989 | Daudelin | 379/223 |
| 5,014,303 | 5/1991 | Velius | 379/266 |
| 5,282,244 | 1/1994 | Fuller et al. | 379/230 |
| 5,329,583 | 7/1994 | Jurgensen et al. | 379/265 |
| 5,420,916 | 5/1995 | Sekiguchi | 379/230 |

(List continued on next page.)

FOREIGN PATENT DOCUMENTS

| | | |
|---|---|---|
| 0 142 004 | 5/1985 | European Pat. Off. . |
| 0 358 408 A2 | 3/1990 | European Pat. Off. . |
| 0 478 206 A2 | 4/1992 | European Pat. Off. . |
| 0 647 051 | 4/1995 | European Pat. Off. . |
| 0 707 406 | 4/1996 | European Pat. Off. . |
| 0 726 682 A2 | 8/1996 | European Pat. Off. . |
| 4 441 753 | 6/1995 | Germany . |
| 96/04754 | 2/1996 | WIPO . |
| 96/14704 | 5/1996 | WIPO . |
| 96/19904 | 6/1996 | WIPO . |
| 96/38018 | 11/1996 | WIPO . |
| 97/16007 | 5/1997 | WIPO . |

OTHER PUBLICATIONS

*Telecommunication Journal of Australia,* vol. 46, No. 3, 1996, pp. 13–18, XP002048699, John Damrow et al., "The Intelligent Nework Call Centre".

*Annual Review of Communications,* vol. 46, Jan. 1, 1992, pp. 619–625, XP000321976, R.W. Petrunka, "Exchange Access & Operator Services in AIN".

*Annual Review of Communications,* vol. 46, Jan. 1, 1992, pp. 491–495, XP000321961, E. Bonkowski, "An End User's Expectations of the Advanced Intelligent Network".

GLOBECOM 89, Fung, "Defining Intelligent network services in a multivendor distributed environment," vol. 1, Nov. 27, 1989, Talas, Texas, US, pp. 132–136, XP000145739.

M. Sevcik and R. Lueder, "Customers in Driver's Seat: Private Intelligent Network Control Point," 15th International Switching Symposium, vol. 2, Apr. 23–28, 1995, pp. 41–44.

(List continued on next page.)

*Primary Examiner*—Scott Wolinsky
*Assistant Examiner*—Benny Q. Tieu
*Attorney, Agent, or Firm*—Nixon & Vanderhye P.C.

[57] ABSTRACT

A telecommunication system coordinates telecommunication services rendered from an intelligent network and a human operator. An operator assistance call center includes one or more human operators each of which has a telephone and an operator workstation. The intelligent network includes a service switching element and a service control element. A party placing a call requests a service having one or more features. The intelligent network receives the call, processes the service request, and integrates one or more service features provided by one of the human operators from the operator assistance call center in rendering the requested service. The operator assistance call center includes a call center server communicating with the plural operator workstations and interfacing with the service control element of the intelligent network. The integration between automated IN services with operator-assisted services broadens the service portfolio that a service provider may offer to subscribers.

22 Claims, 7 Drawing Sheets

U.S. PATENT DOCUMENTS

| | | | |
|---|---|---|---|
| 5,452,350 | 9/1995 | Reynolds et al. | 379/220 |
| 5,490,212 | 2/1996 | Lautenschlager | 379/225 |
| 5,517,562 | 5/1996 | McConnell | 379/207 |
| 5,517,564 | 5/1996 | Slater et al. | 379/229 |
| 5,526,413 | 6/1996 | Cheston, III et al. | 379/201 |
| 5,526,415 | 6/1996 | Wakamoto | 379/230 |
| 5,533,115 | 7/1996 | Hollenbach et al. | 379/265 |
| 5,537,470 | 7/1996 | Lee | 379/266 |
| 5,566,235 | 10/1996 | Hetz | 379/201 |
| 5,583,927 | 12/1996 | Ely et al. | 379/207 |
| 5,621,789 | 4/1997 | McCalmont et al. | 379/265 |
| 5,623,601 | 4/1997 | Vu | 713/201 |
| 5,640,446 | 6/1997 | Everett et al. | 379/115 |
| 5,657,383 | 8/1997 | Gerber et al. | 379/266 |
| 5,680,552 | 10/1997 | Netravli et al. | 709/250 |
| 5,701,301 | 12/1997 | Weisser, Jr. | 370/428 |
| 5,703,935 | 12/1997 | Raissyan et al. | 379/223 |
| 5,724,418 | 3/1998 | Brady | 379/212 |
| 5,757,894 | 5/1998 | Kay et al. | 379/127 |
| 5,784,450 | 7/1998 | Stahl | 379/233 |
| 5,784,451 | 7/1998 | Smith, Jr. | 379/265 |
| 5,797,092 | 8/1998 | Cox et al. | 379/203 |
| 5,805,692 | 9/1998 | Oerlemans et al. | 379/225 |
| 5,818,921 | 10/1998 | Vander Meiden et al. | 379/225 |
| 5,825,856 | 10/1998 | Porter et al. | 379/93.12 |
| 5,825,868 | 10/1998 | Diamond | 379/243 |
| 5,838,782 | 11/1998 | Lindquist et al. | 379/230 |
| 5,841,854 | 10/1998 | Schumacher et al. | 379/265 |
| 5,852,660 | 12/1998 | Lindquist et al. | 379/230 |
| 5,867,570 | 2/1999 | Bargout et al. | 379/207 |
| 5,940,493 | 8/1999 | Desai et al. | 379/260 |

OTHER PUBLICATIONS

Proceedings of the National Communications Forum, Calautti, "Issues and some solutions for internetwork CCS7 implementation," vol. 45, Sep. 30, 1991–2 Oct. 1991, Chicago, Illinois, US, pp. 220–222, XP000267446.

*Telecommunications Journal of Australia,* vol. 46, No. 3, 1996, pp. 13–18, XP002048699, John Damrow et al., "The Intelligent Network Call Centre".

*British Telecommunications Engineering,* vol. 14, Jul. 1995, pp. 98–105, Andrew Catchpole et al., "Introduction to Computer Telephony Integration".

International Switching Symposium, Oct. 25–30, 1992, Yokohama, Japan, vol. 2, pp. 34–38, Ingeborg Graetz et al., "IN and CSTA—two sides of the same coin?".

*BYTE,* Sep. 1995, pp. 201–207, James Burton, "Standard Issue".

*Hewlett Packard Technical Data,* "Applied Computerized Telephony (ACT)".

*Ericsson Product Overview,* Ericsson Business Networks AB 1996, EN/LZT 102 2389 RA, pp. 5–27, "MD110 ApplicationLink for CSTA 2.0".

METHOD AND ARRANGEMENT FOR INTEGRATING INTELLIGENT NETWORK SERVICES WITH OPERATOR ASSISTED SERVICES

RELATED APPLICATIONS

This application is related to two commonly-assigned patent applications entitled "Cooperative Call Processing Across Public and Private Intelligent Networks" and "Computer Telephony Integration Gateway", the disclosures of which are incorporated herein by reference.

FIELD OF INVENTION

The present invention relates generally to telecommunication services, and more particularly, to intelligent network services and operated-assisted services.

BACKGROUND AND SUMMARY OF THE INVENTION

Intelligent networks provide network operators with considerable flexibility and economy in structuring product offerings and providing a wide variety of telecommunications conveniences and services. A typical intelligent network architecture allows the switched transport to interact with database systems and intelligent peripherals. When a service subscriber/user dials the number of an advanced service, i.e., an intelligent network call, the local telephone exchange transfers this call to an exchange with a service switching function (SSF). Such an exchange is often referred to as a service switching point (SSP) and may be an ordinary exchange, i.e., local, transit, tandem, or international. The SSF detects trigger conditions during the normal switching process. Such trigger conditions can occur at the origination of a call, during a call, and at the termination of a call. After triggering an incoming IN call, the SSF sends a message to a service control function (SCF) in a service control point (SCP) located in the same exchange or at different exchange. During an intelligent network call, a number of messages may be sent between the SSP and the SCP.

The information flows between the network functions residing in different physical nodes are implemented in the IN application layer is protocol (INAP). The INAP protocol uses transport capabilities application part (TCAP) on top of connectionless SCCP (signaling connection control part). The application layer messages are specified in abstract syntax notation 1 (ASN.1).

When the SSF detects a trigger, it sends a message containing the dialed number and general call information to the SCF. The SCF invokes appropriate service logic to analyze the received message. Such analysis identifies the requested service and also provides charging information. The SCF then issues one or more commands to the SSF to initiate the appropriate actions to fulfill the service such as setting up or releasing connections, activating an intelligent peripheral, etc. Intelligent peripherals conduct communication with subscribers by sending various automated voice announcements and receiving responses in the form of subscriber dual tone multiple frequency (DTMF) digit tones. Intelligent peripherals allow the subscriber to access services that current network signaling systems do not support.

A significant advantage of intelligent networks is that the service control architecture is independent of the underlying communications network. Each IN service is typically composed of several service features or basic, reusable components called service independent building blocks (SIBs). Service independent building blocks provide network operators with the ability to design their own advanced services as service "scripts" simply by properly selecting and sequencing basic service script modules. A service script combines service logic and service data in a particular sequence of SIBs designed and tested to provide a particular service. During call processing and rendering of a service, the service script corresponding to the service is "interpreted" or executed to provide the requested service. Each new service is defined, specified, developed, and tested in a special service creation environment linked to a service management system (SMS) and then simply downloaded to the service control point. Service script software need only be implemented in the SCP and not in every switch within the network.

Thus, an IN concentrates the data and functions required for a service into a minimum number of nodes, separates service logic from the network resources, logically views the service data and resources, and separates service creation from the network provision of these services. As a result, the intelligent network architecture provides substantial flexibility and efficiency in the design and rendering of specific services.

A significant shortcoming of IN services is that they do not integrate operator-assisted support/services. In other words, IN services are generally limited to machine-implemented, automatic services. There are many instances, however, where machine-implemented services alone are unsatisfactory or otherwise undesirable. For example, consider an IN service scenario instance where a caller dials a special "800" service number in order to make a credit card purchase or to order an airline flight ticket. This "800" number is recognized and routed to an appropriate SSP. The SSP detects a call trigger and queries the SCP as to how to handle the call. The IN service scripted in the SCP for handling the call uses an Interactive Voice Response (IVR) intelligent peripheral to initiate interaction between the caller and the IVR machine. The caller is prompted for different types of information such as entry of an account number, flight destination, dates of travel, etc. Perhaps in the interaction between the caller and the IVR intelligent peripheral the caller is offered a menu of different options one of which may be selected by depressing an appropriate DTMF key or key sequence.

In addition to this automated service, many callers want to request additional services not offered as one of the automated menu options, or sometimes the caller needs a service that cannot be provided by an automated attendant. As an example of the latter, if the caller is entering erroneous information or making inconsistent selections, i.e., is having difficulty with the automated interface, it would be desirable to involve a live operator who could volunteer assistance to the caller. A live operator could answer questions, provide further information regarding various options, and take appropriate action to assist the operator or render further services. But this kind of cooperation between live operators and IN-based automated services is not available.

Still further, it would be desirable that after assisting the caller, the operator is able to redirect the call back to the original IN service at the same point at which the service was interrupted or at a different point. It would also be desirable to alternatively permit an operator to redirect the call to another destination, e.g., to another party or to another service oriented device like the caller's voice mailbox. To achieve such flexible operator interface with the IN network, it would be desirable that the IN service logic respond to service logic level commands initiated by a human operator in the rendering of a service to a caller. Moreover, it would be desirable to provide such flexible service capabilities and integration between standard IN services and operator-assisted services without having to physically route all calls to a single switching node to which the operator is connected.

Accordingly, it is an object of the present invention to integrate human operator-based services with IN-based services.

It is an object of the invention to provide cooperation between live operators and automated IN-based services.

It is an object of the invention to provide a mechanism by which service feature requests and responses are communicated between the service logic of an IN-based service and a human operator workstation.

The present invention overcomes these problems and needs and achieves these and other objects by integrating automatic IN services with operator-assisted services on business, service, and technology levels. This integration broadens the service portfolio that a service provider offers to subscribers to include both automatic and manually assisted (i.e., operator-assisted) services. Moreover, the flexibility of IN, script-based service development may be advantageously deployed to develop services that involve both automatic and operator service feature elements. In other words, both automatic and operator service features may be freely combined into new service scripts. An example of such an integrated script might be a "fall back" service to a human operator in the automatic attendant (IN) service as described above.

Since the control activities of the operator system are integrated at a logical level with the control activities of the IN system, the service logic of the operator system is separated from network switching functions. As a result, calls no longer have to be physically routed to the switching node where the operator is connected. In addition, the same network planning and strategy principals employed in standard IN services may also be applied to operator services. The invention also allows more flexibility to optimally utilize remote human operators. Other automatic resources such as announcement machines, voice recognition devices, speech synthesis devices, etc. are more efficiently utilized being shared by both IN services and operator-assisted services.

The present invention includes a method for providing telecommunications services where a call is initially detected in an intelligent network from a party requesting a telecommunications service. The call is processed and an intelligent network service is provided using service logic and resources in the intelligent network. At some point in the call, it is determined that the call requires the assistance of a human operator outside of the intelligent network. The call is then connected to the human operator which provides an operator-assisted service to the caller in addition to the service provided by the intelligent network.

In communicating with the caller, the operator may initiate an action at an operator workstation that is ultimately provided to and executed by the intelligent network service logic. Such execution typically includes executing one or more service independent building blocks to implement the operator-initiated command in the context of a service script composed of several service independent building blocks. Significantly, the communications path established between the operator workstation and the intelligent network service logic is independent of telephony switching functions.

A telecommunications system in accordance with the present invention includes an operator assistance call center with one or more human operators where each human operator has an operator workstation and a telephone. The intelligent network includes a service switching element and a service control element. After receiving and processing a service request from a calling party, the intelligent network integrates one or more service features provided by one of the human operators from the operator assistance call center in rendering the requested service.

A call center server communicates with the operator workstations and the service control element of the IN. The call center server functions as a gateway between the plural operator workstations and the IN service logic. The call center server provides information regarding the calling party forwarded by the intelligent network service control element to the operator workstation to aid the operator in servicing the caller. In interaction with the caller, the operator may generate a command at the operator's workstation requesting that the call be redirected to another calling destination. The calling center server conveys that command to the intelligent network service control element which then instructs the service switching element to redirect the call to the other calling destination. Advantageously, the present invention also permits the call center server to provide billing information to the intelligent network corresponding to the service provided by the operator in order to determine an overall charge for the call by the intelligent network.

Additional objects, advantages, and novel features of the present invention will be set forth in part in the description which follows, and in part will become apparent to those skilled in the art upon examination of the following, or may be learned by practicing the invention.

DETAILED DESCRIPTION

In the following description, for purposes of explanation and not limitation, specific details are set forth, such as particular embodiments, elements, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and elements are omitted so as not to obscure the description of the present invention with unnecessary detail.

Figure 1:
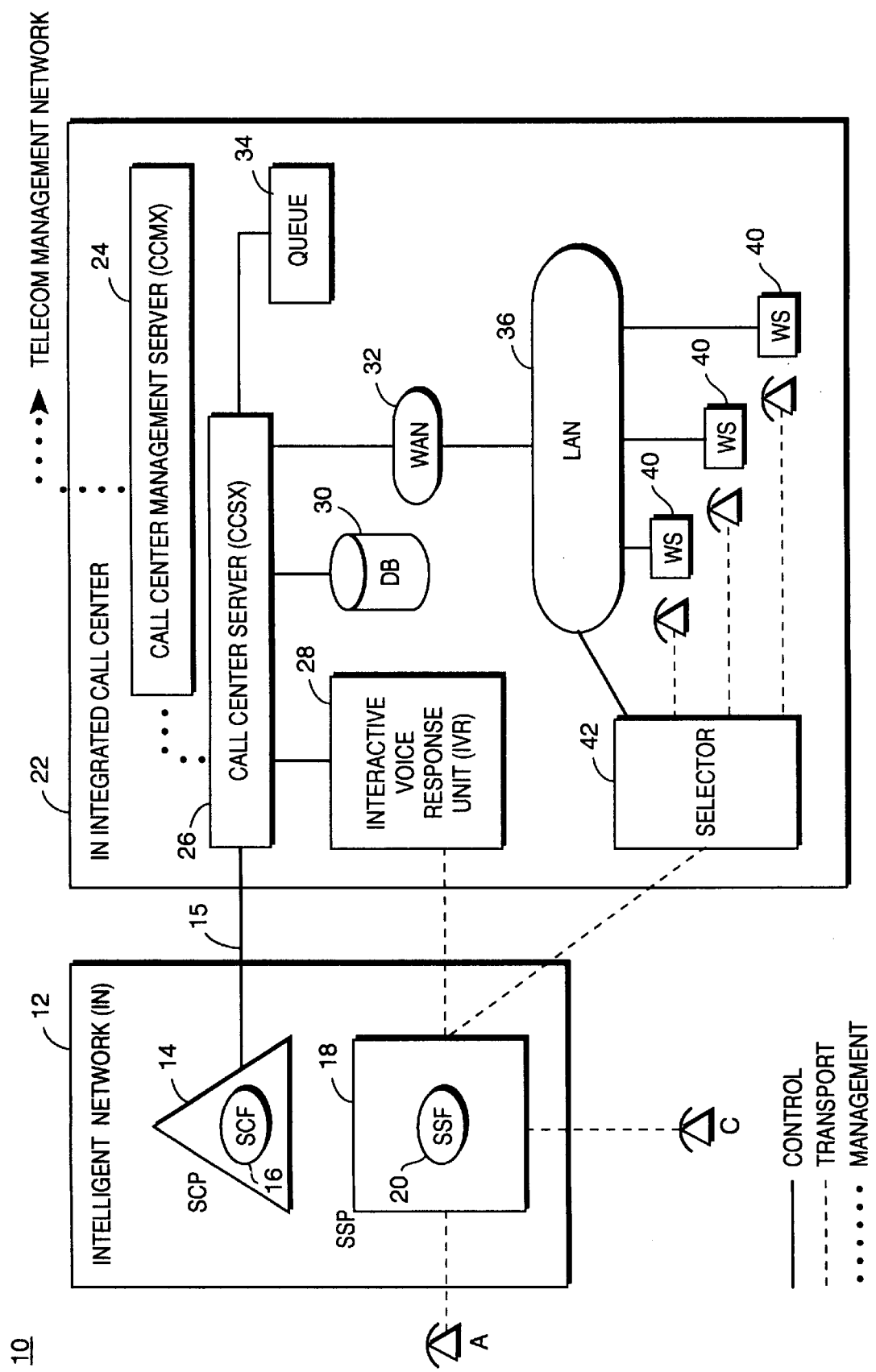
FIG. 1 is a function block diagram of a telecommunications system in accordance with an example embodiment of the present invention.

FIG. 1 illustrates a telecommunications system for providing integrated intelligent networks and operator-assisted service in accordance with an example embodiment of the present invention. An intelligent network is indicated at reference numeral 12 and includes a service control point 14 connected to a service switching point 18. The service control point includes a service control function (SCF) 16 which includes service control logic and service control data. The service switching point 18 includes a service switching function 20 which, in addition to routing/switching functions, processes calls monitoring for IN service triggers. The SCP 14 and SSP 18 communicate over a control path using a suitable protocol, e.g., INAP. Control paths are indicated at solid lines, telephony transport paths as dashed lines, and management signals as dotted lines. Telephone terminals for parties A and C are shown connected to the SCP 18 and are referred to in subsequent examples set forth below.

Connected to the intelligent network 12 is an IN integrated call center 22. The integrated call center 22 may be independently configured or may be readily adapted using equipment and software in existing automatic distribution call centers. The integrated call center 22 includes a call center server (CCSX) 26 connected over a control communications path to the SCP 14. The call center server 26 is also connected to a call center management server (CCMX) 24 which is connected to a telecommunications management network. An interactive voice response (IVR) unit 28 and a database 30 are connected via respective control paths to the call center server 26. The IVR unit 28 is also connected to the SSP 18 by a telephony transport path.

The call center server 26 is connected to a plurality of workstations 40, preferably by way of a network. The example shown in FIG. 1, the call center server 26 is connected to a wide area network (WAN) 32 which in turn is connected to a local area network (LAN) 36. The operator workstation terminals 40 are connected to communicate with the call center server and with each other via the local area network 36. Each operator workstation includes computer and telephony hardware and software for performing operator-assisted services and for communicating over the network with the other workstations and the call center server 26.

In handling requests from the SCP for operator-assisted services, the call center server performs initial voice greetings using interactive voice response (IVR) unit 28, queues incoming calls in queue 34, and selects available and appropriate operators using a selector 42. The selector 42 is connected by a control path to the local area network 36 and by a telephony transport path to the SSP 18. Under the control of an automatic call distribution (ACD) function in the call center server, the selector 42 routes incoming calls to the telephony equipment of selected workstations 40.

The actual operator-assisted services provided by the integrated call center 22, the selection and distribution of calls to operators, and the monitoring of the performance by various operators may include for example any automatic call distribution applications found for example in private branch exchange (PBX)-type applications. Of course, the present invention envisions other private network type services and especially new services being provided by operators in the integrated environment of the present invention, i.e., new operator-assisted, IN services.

Figure 2:
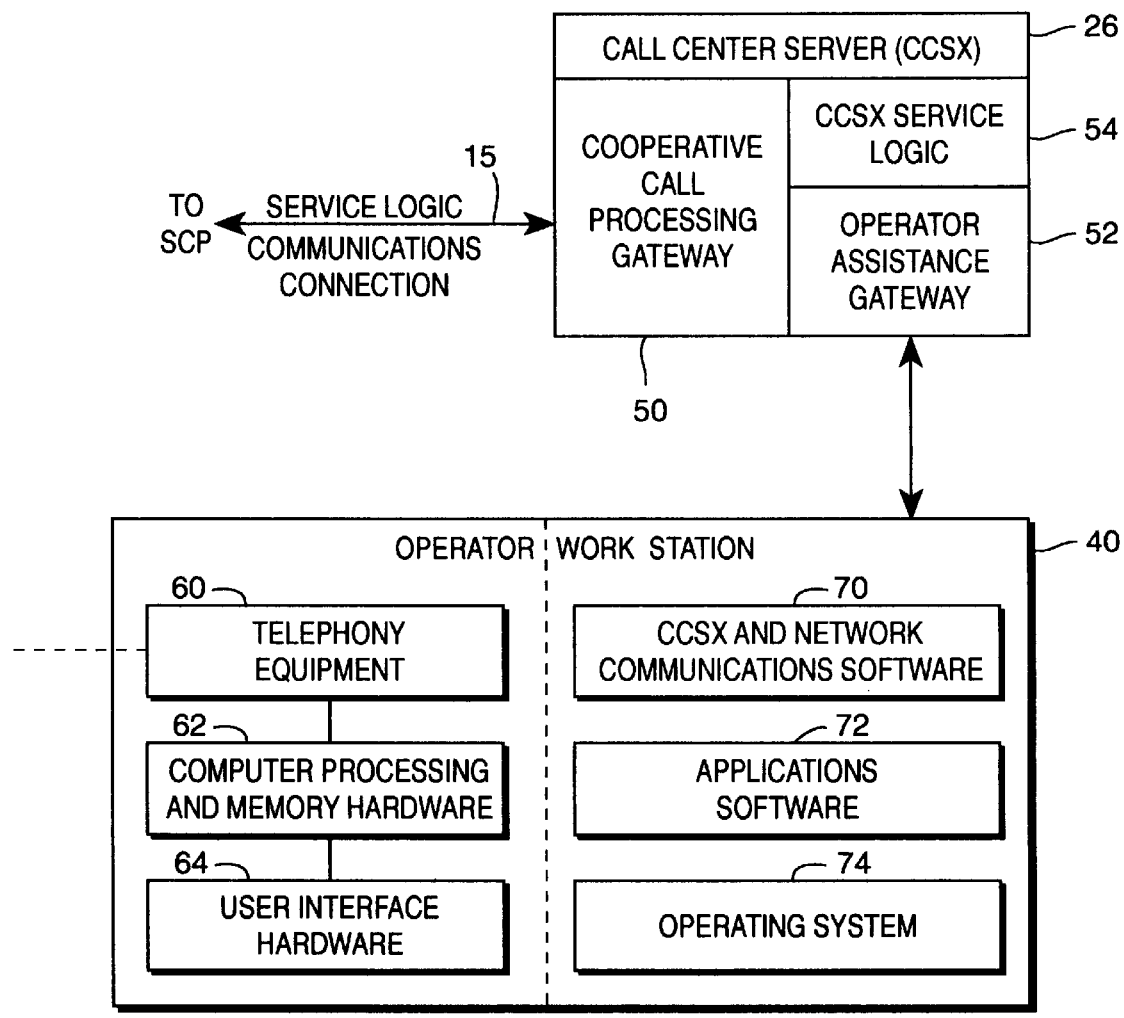
FIG. 2 is a function block diagram illustrating further details of the call center server and an operator workstation illustrated in FIG. 1.

In the presently preferred example embodiment, the call center server 26 functions as an operational "gateway" to establish and coordinate communications between the service logic of the IN network 12 and the operators in the integrated call center 22. Further details of the call center server 26 and the communications between the SCP 14, the call center server 26, and the operator workstations 40 are now described in conjunction with the function block diagram in FIG. 2.

The call center server 26 includes a cooperative call processing gateway 50 used to establish a service logic level communications connection with the SCP 14. The cooperative call processing gateway 50 maps operations between the CCSX service logic 54 and the INAP protocol used by the SCP 14 in the intelligent network 12. In a preferred example, non-limiting embodiment, the cooperative call processing gateway and protocol are implemented using the cooperative call processing procedures described in commonly assigned, related patent application entitled "Cooperative Call Processing Across Public and Private Intelligent Networks" incorporated by reference above. Details of the cooperative processing gateway procedures are set forth in that patent application.

Briefly, a logical relationship is established over an end-to-end service logic communications path between the cooperative call processing gateway 50 and the service logic of the SCP 14 using a small set of operation procedures. With that set of operation procedures, the SCP service logic requests a service feature to be performed by a selected operator workstation 40 in the integrated call center 22. The service feature request is made using a Start operation command coupled with a specific service feature Start argument and corresponding data attributes for the specific service Start argument. When the Start operation is transmitted by the service control logic of the SCP 14 to the call center server 26, the call center server 26 communicates that request to a selected workstation 40 and returns a Continue operation coupled with a service feature result argument generated by the workstation over the established connection. After the service feature result is returned, a determination is made if further servicing is needed to provide the requested service feature. If so, a Continue operation coupled with a specific feature Continue argument is sent. Otherwise, a Stop operation is used to logically complete the requested service feature. An Event operation is used to transmit one or more events to be taken into account when providing the requested service feature. This client server based model of communications between the SCP 14 and the cooperative call processing gateway 50 is symmetric. In other words, the call processing gateway 50 may function as the client sending requests, and the SCP 14 may function as the server receiving the service feature requests and providing service feature responses.

The call center server 26 includes its own service logic 54 which includes a number of service scripts described in further detail below. Of course, the CCSX service logic would also be programmed using other programming techniques/models. The CCSX service logic 54 is scripted with service independent building blocks (SIBs) which represent capabilities within as well as outside the call center server 26 as described in further detail below.

The call center server 26 also includes an operator assistance gateway 52 which controls communications between the various workstations and the CCSX. The data communications protocol is preferably TCP/IP based, and the applications protocol may for example be a standard computer telephony interface (CTI) protocol such as Computer Supported Telecommunications Applications (CSTA). Other proprietary protocols specifically tailored for operator-assisted services might for example be employed for greater flexibility or efficiency as opposed to "open" protocols like CSTA.

The operator workstation 40 is divided conceptually by a dashed line with one-half showing various hardware components and the other half showing various software components as functional blocks. In terms of hardware, each operator workstation preferably includes some sort of telephony integration equipment 60 connected to computer processing and memory hardware 62. User interface hardware 64 is also connected to the computer hardware 62 and might include for example a keyboard, mouse, display screen, etc. The operator workstation software 40 may include communications software 70 for communicating with the call center service 26 and with other workstations connected to the local area network 36 and/or wide area network 32. Also included are applications software 72 for running various operator-assisted services software routines. The operating system 74 is preferably a Windows-type operating system. Call center service scripts may then be implemented taking advantage of using the Windows graphics user interface, e.g., each CCSX script has its own window.

Figure 3:
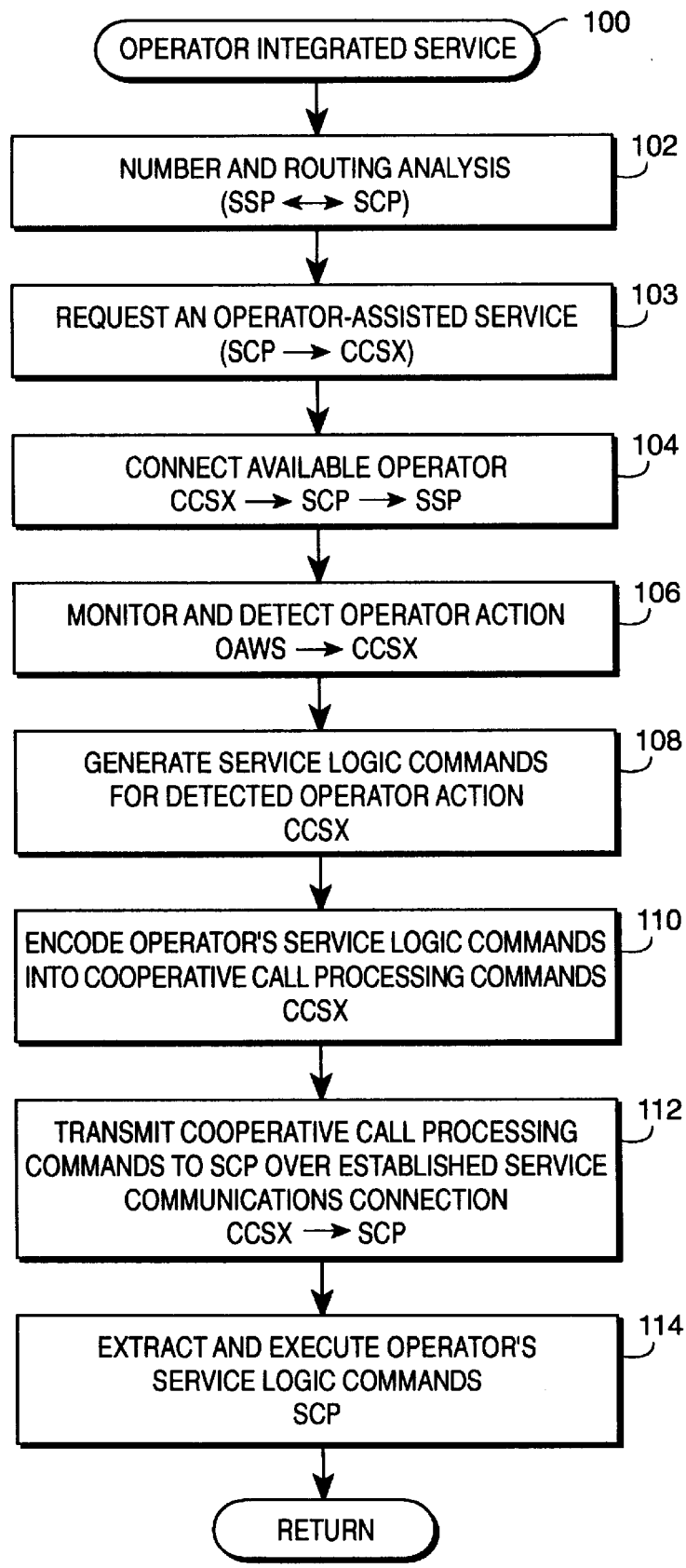
FIG. 3 is a flowchart diagram illustrating procedures for implementing operator integrated IN services in accordance with an example embodiment of the present invention.

The overall operation of the above-described system is now overviewed using the procedures set forth in the flowchart routine in FIG. 3 entitled "Operator Integrated Services" (block 100). An initial call is received from Party A in the SSP 18 of IN 12 which performs number and routing analysis on the calling party's telephone number (the A telephone number) and the destination telephone number (the B telephone number). During this analysis, the SSP 18 detects a trigger, e.g., a special service number, which causes the SSP 18 to initiate a query with the SCP 14 to commence the service (block 102).

The SCP 14 analyzes the call information provided by the SSP 18 and identifies the requested service and the resources for providing the requested service. Typically, the SCP 14 identifies a service script corresponding to the requested service and executes that service script. During the IN service script execution, the SCP 14 determines that an operator-assisted service is requested or otherwise necessary. The SCP 14 establishes a communications link 15 (shown only symbolically in FIGS. 1 and 2) to contact the call center server 26 and establish a cooperative call processing session (block 103).

The call center server 26 analyzes the request and selects an available operator. The call center server 26 responds by requesting over communications link 15 requesting that the call be routed to the integrated call center 22 (block 104). The SCP 14 sends a command message to the SSP 18 causing the SSP to route the call to the call center 22. Instructions from the call center server 26 via the networks 32 and 36 control selector 42 to route calls either to waiting queue 34 if an operator is not available or directly to a selected operator 40. Before routing the call to selector 42, the call center server may initially have the call routed to the interactive voice response unit 28 to play initial announcements, provide instructions, and perhaps gather additional information from menu options selected by the caller from his DTMF keypad. While a call is being routed to the selected operator telephone, the call center server 26 is provided information regarding that caller forwarded over communications link 15 as well as the requested service. Other relevant caller and/or service-related information may also be extracted from database 30.

The call center server 26 then monitors operator actions (block 106). During interaction with the caller A, the operator may take some action regarding the call through the graphic user interface 64 of the operator's workstation 40, e.g., transfer the call to destination telephone number C. The call center server 26 detects that operator action via the networks 32 and 36 and generates appropriate service logic commands that will be understood by the intelligent network (block 108). The call center server 26 then encodes those operator service logic commands into cooperative call processing commands (block 110), and transmits them to the SCP 14 over the established service communications link 15 (block 112). The SCP 14 extracts and executes the operator service logic commands (block 114). For example, if the operator service command is to transfer the call from the integrated call center 22 to destination C, the SCP 14 sends a corresponding instruction to effect that action to the SSP 18.

Figure 4:
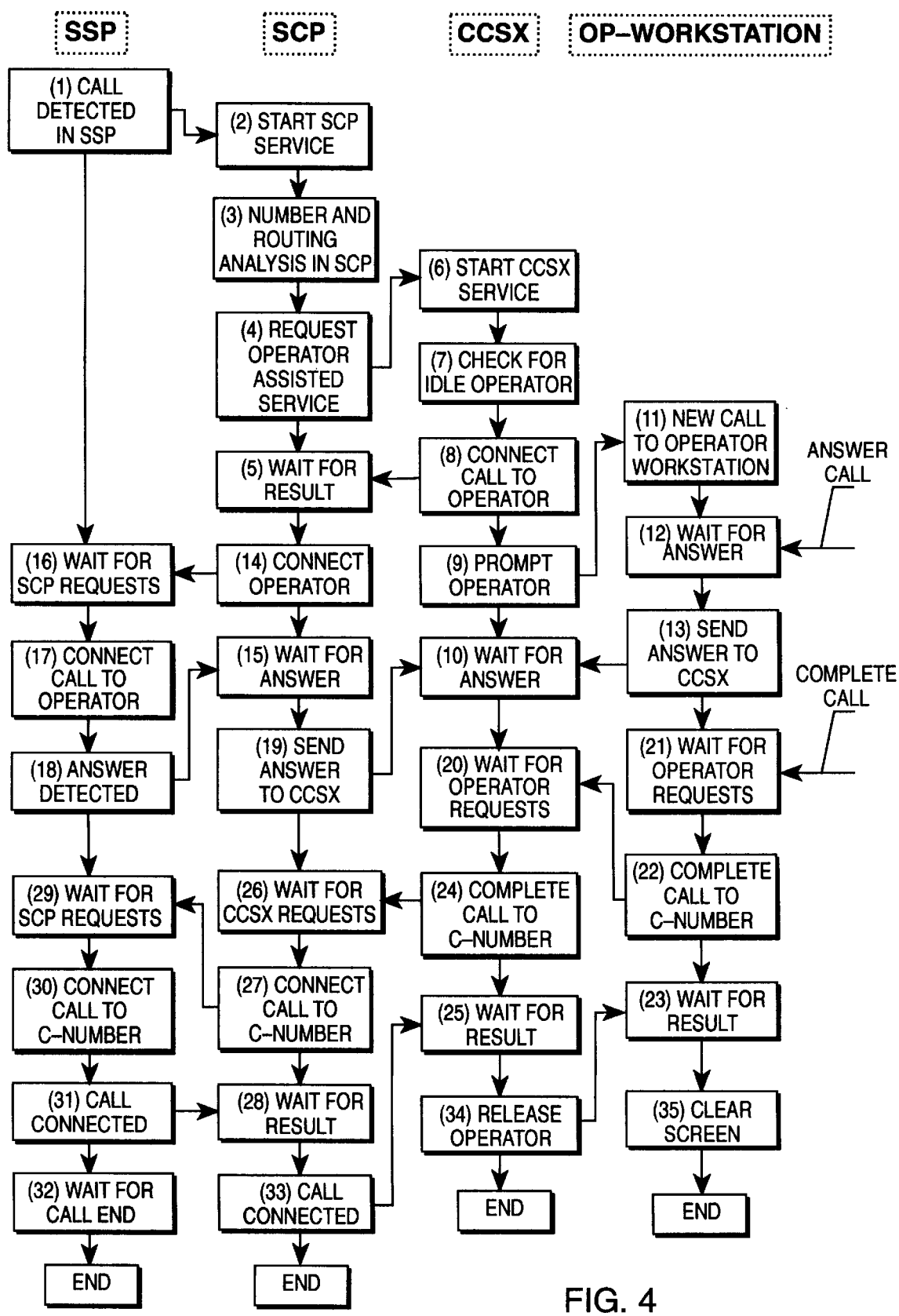
FIG. 4 is a flow diagram outlining an example signal flow sequence for the operator-assisted service used for FIG. 3.

A more detailed sequence of signal flows of the above example will now be described in conjunction with the flowchart shown in FIG. 4. Four columns are shown: the SSP, the SCP, the CCSX and the operator workstation. Each block in a column corresponds to a process or function that occurs or is performed at that location. The signal flows are indicated by arrows.

A call is detected in the SSP (1), and the SSP initiates a query to the SCP along with all available call information. After this, the SSP waits for requests from the SCP (16). The SCP receives the query from the SSP (2) and initiates IN service logic to perform the number and routing analysis (3). The SCP then requests an operator-assisted service (4) and sends a request message to the call center server and waits for the result (5). When the CCSX receives the operator service request, the CCSX service logic is started (6). The CCSX checks for an idle operator to handle the call (7). At this point, the operator-assisted service preferably is expanded with automatic call distribution (ACD) queuing functionality and interactive voice response as mentioned above. When an idle operator is identified, a command is sent from the CCSX to the SCP (8) to connect to the voice portion of the call to the selected operator. At the same time, the selected operator is prompted to expect the new call by a signal sent from the CCSX and displayed on the operator's workstation display screen (9). The available call information may be included in this prompting signal or may be accessed later by a request to the CCSX from the operator workstation. The CCSX then waits for an answer (10) both the operator workstation and from the SCP with the CCSX synchronizing both answer signals.

When the new call is received by the operator workstation (11), the call information is displayed on the screen, and the workstation waits for the operator to answer the call (12). The operator answers the call by depressing a key on his keyboard, selecting an icon on the operator workstation display screen, etc., and an answer is sent to the CCSX (13), and the operator workstation waits for requests (orders) from the operator (21). The voice/transport connection is also received by operator workstation if the telephone is integrated into the workstation. Of course, the telephone call may also be received at an ordinary telephone set at the operator's desk. The telephone answer is reported to the SCP by the SSP (18).

When an order to connect the operator is received by the SCP from the CCSX (5), the SSP is instructed to set up the voice/transport connection (14) by establishing a call through the telephone network (17). Both the SCP (15) and the SSP (18) wait for the operator to answer the call. The detected answer is sent as an event to the CCSX (19) and synchronized with the answer from the workstation (10). The SSP, SCP, and CCSX then all wait for new requests (29), (26), and (20), respectively.

When the operator completes the dialogue with the party A, the operator orders a transfer of the call to a new destination such as a C number (21) by entering a keyboard command by pressing an icon and entering the C number. The order and C number are sent to the CCSX (22) which orders the SCP to complete the call (24). The message in block 22 is only an example of an operator message. Of course, other types of operator messages are also handled. Messages transferred to SCP 14 in block 24 may be for the purpose of executing any SCP implemented capability or any supported switch control function in the SSP 18 such as connecting new parties to the call, disconnecting parties, connecting the party to hold, executing both CCSX internal service logic, requesting data from the database 30, controlling an IVR 28, etc. Any limitation of the type of messages depends on the capabilities of the SSP 18, SCP 14, and the CCSX 26. Both the CCSX (25) and operator workstation (23) then wait for the result. When the result is received by the SCP (26), the SSP is ordered to connect to the call (27), and the SCP waits for the result (28).

When the order is received by the SSP (29), the call is connected via the telephone network under control of the SSP (30). When the call is connected, the SCP is notified (31), and the SSP waits for the end of the call (32). In this example, the communication between the SSP and the SCP for this call is ended (31). Of course, this relationship may be maintained by other types of services, if a recall to the operator is required after the end of the call. When the SCP is notified that the call has been connected to the C number by the SSP (28), the SCP notifies the CCSX (33) of this event (33). When the call and notification is received by the CCSX (25), the operator is released (34), and the operator screen is cleared (35). The call session is then ended in the CCSX and the operator workstation.

In a preferred but non-limiting example embodiment of the present invention, the call center server 26 employs different types of service application scripts to implement the functions of CCSX service logic 54. An operator access script is used to handle all non-call related action requests from the operator such as log-on, log-off, communications with other operators connected to a network, etc. When the operator receives an incoming call, the operator access script is also used to start an operator-related call script described below. One instance of an operator access script corresponding to each operator is started when the operator starts an application on his workstation.

A call script handles all call related functions for an incoming call. For example, the call script may connect an interactive voice response (IVR) unit to play greeting messages and provide an initial voice menu to the caller. The call script may also invoke an automatic call distribution function to queue calls if an operator is not available. When an operator does become available, the call script indicates to the operator access script that there is a new call. One instance of the call script is initiated for each incoming call to the integrated call center 22.

The operator-related call script mentioned above handles all call related action requests or commands from the operator such as hold, retrieve, park, disconnect, etc. The operator-related call script is started when a new call is received or when the operator initiates an outgoing call. The operator-related call script may contain several instances, one for each call connected to an operator. For example, an operator can be connected to several calls with the operator currently interacting with one call having parked the other calls in some fashion.

Figure 5:
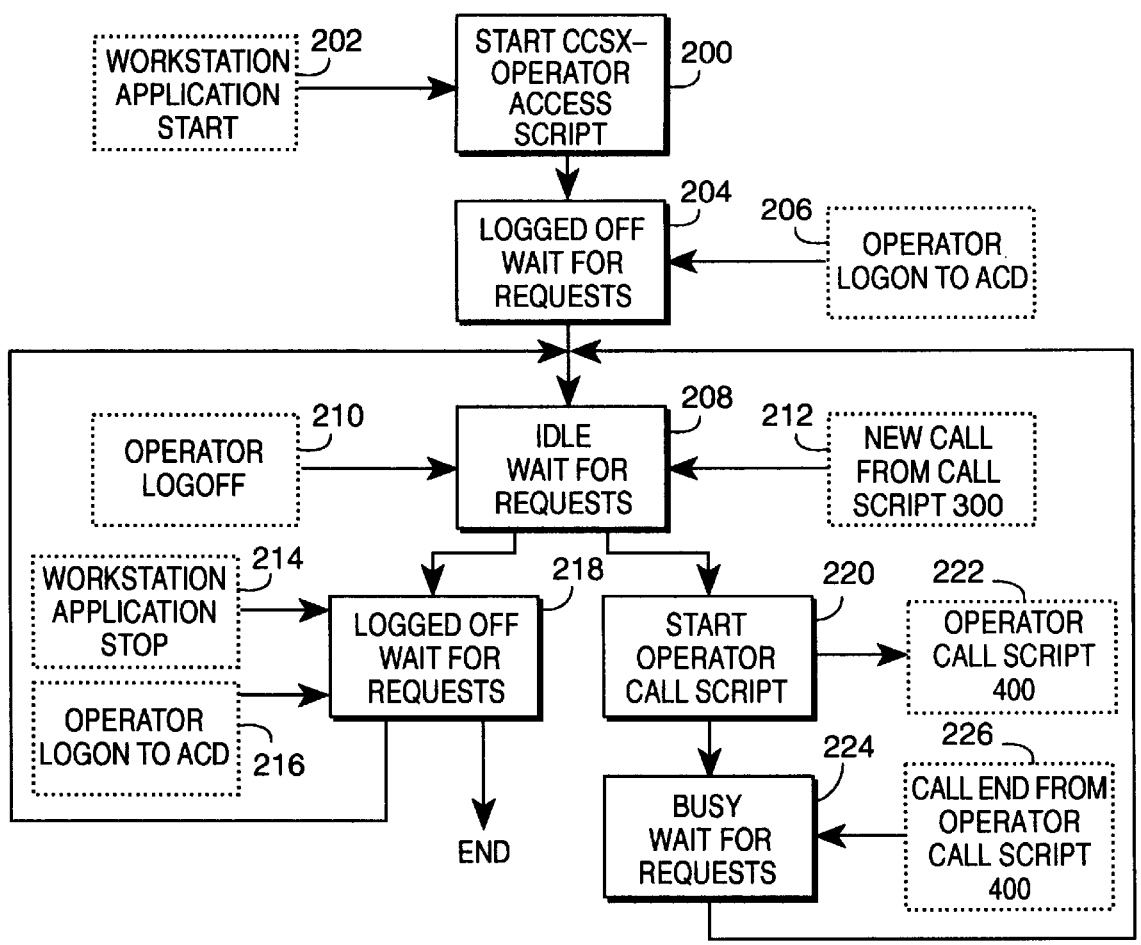
FIG. 5 is flowchart diagram illustrating a call center server operator access script routine 200 in accordance with an example embodiment of the present invention.

FIG. 5 illustrates an example operator access script 200 in flowchart type format. When an operator workstation application begins (block 202), an operator access script 200 is launched. The access script waits for the operator to log-on (block 204). When the operator logs on (block 206), the operator access script then enters an idle process (block 208) waiting for requests. One request is an operator log off (block 210); the other request is a new call received from call script 300 described below (block 212). If the operator logs off, the operator access script waits for further requests (block 218) such as a request to stop the workstation application (block 214) or renewed requests by the operator to log back on (block 216). If the operator logs back on, control returns to block 208. If a new call is received from the call script 300, an operator-related call script 400 (block 222) is then started (block 220). The operator access script then enters a busy state and waits for a call end indication (block 224) from the operator-related call script 400 (block 226).

Figure 6:
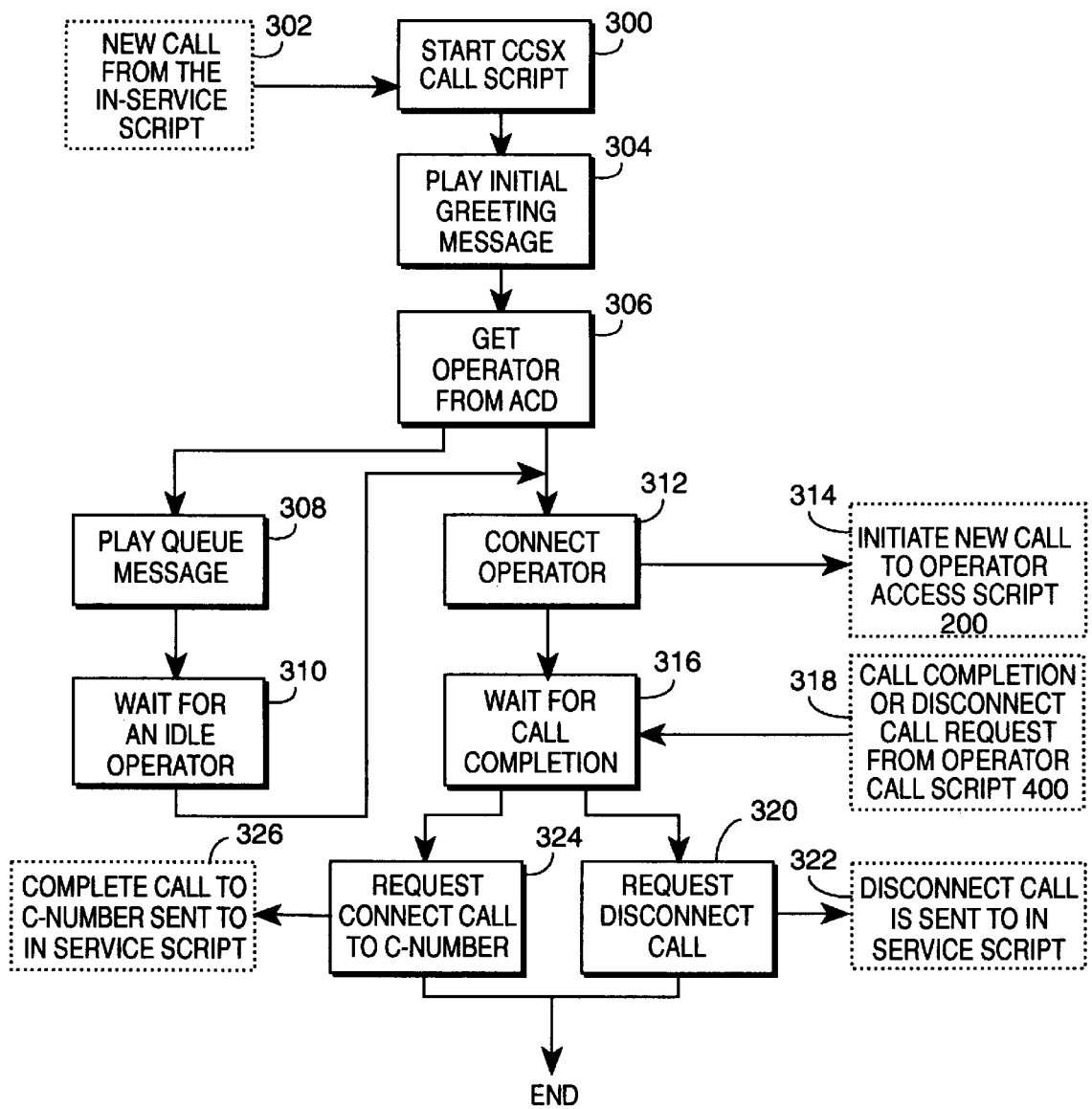
FIG. 6 is a flowchart diagram illustrating a call center server call script routine 300 in accordance with an example embodiment of the present invention.

FIG. 6 illustrates an example call script 300 initiated when a new incoming call is received from the SCP (block 302). After an initial (optional) greeting message is played (block 304), an idle operator is requested from the ACD application (block 306). If there are no idle operators, the ACD application plays a queue message (block 308), queues the call in queue 34, and waits for an idle operator (block 310). When an idle operator is identified, the call is connected to that operator (block 312). The call script 300 then initiates a new call to the operator access script 200 (block 314) and waits for completion of the requested call connection (block 316). A call completion or disconnect call request from the operator call script 400 is received (block 318). The call script 300 then requests a call disconnect (block 320) which is sent to the SCP IN service script (block 322) over session link 15. Alternatively, the call script 300 requests connection to the C number noted above which is then sent to the SCP service script (blocks 324 and 326).

Figure 7:
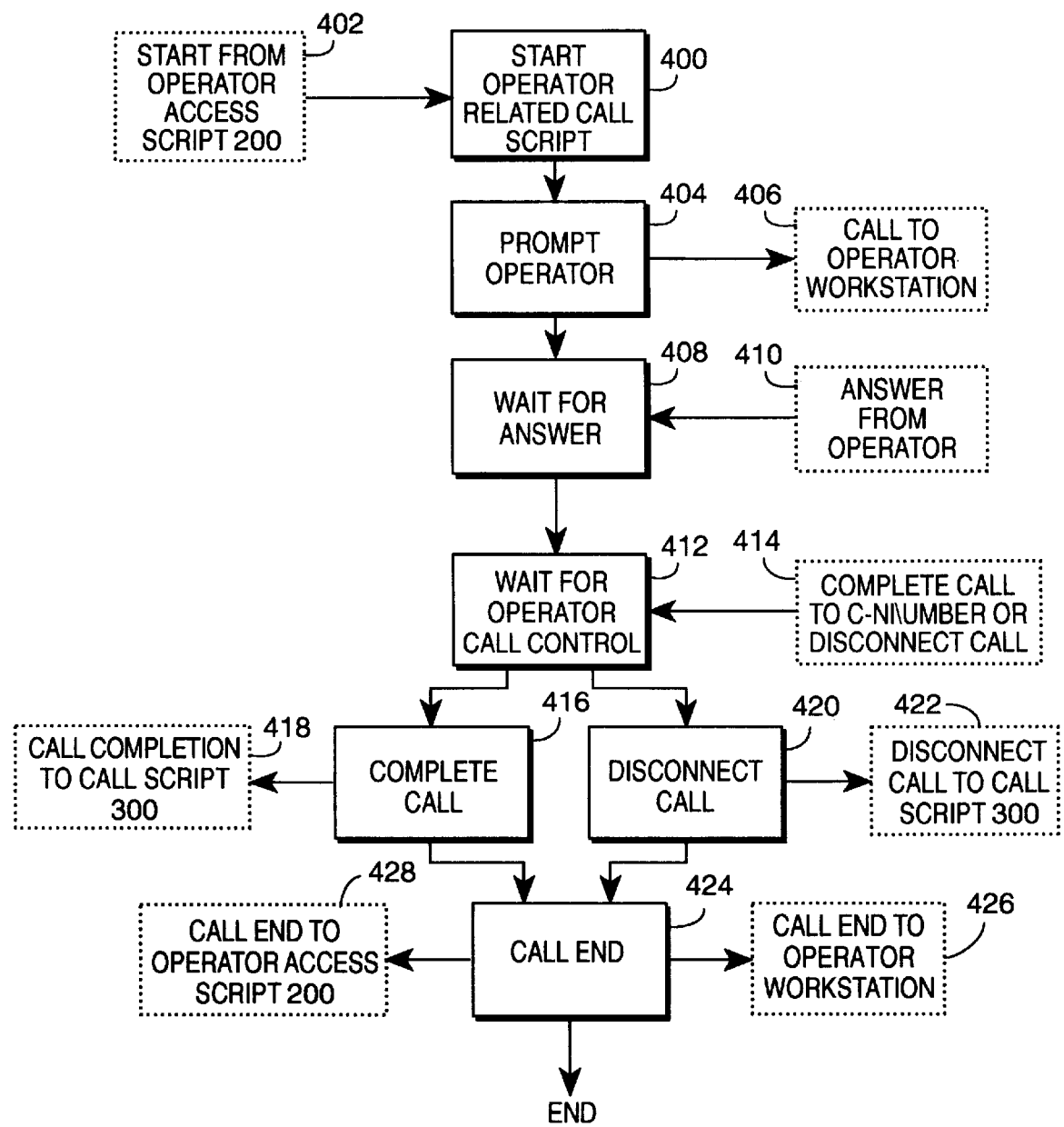
FIG. 7 is a flowchart diagram illustrating an operator-related call script routine 400 in accordance with an example embodiment of the present invention.

FIG. 7 illustrates an example operator related call script 400 is initiated from the operator access script 200 (block 402) when a new call to the operator is received. The operator is given a call prompt of the call and provided with existing call information (blocks 404 and 406). The operator related call script 400 then waits for an answer from the operator. When the call is answered from the operator (block 410), the operator related call script 400 waits for operator action (block 412). In the simple example being used in the detailed description, the operator may complete the call to a new destination (block 416) or disconnect the call (block 420). If a call completion action is received, the call script 300 is notified (block 418). If a disconnect call is received, the call script 300 receives a disconnect call order (block 422). In either event, the call is ended (block 424) with the call end communicated to the operator access script 200 (block 428) and the operator workstation (block 426).

There are many possible service applications that integrate operator interaction into an IN-based service such as the example operator services set forth below.

Operator Fallback Service: An operator is connected in an automated service to help the subscriber to perform the service as a "fall back" upon subscriber request or detected need.

Directory Inquiry Service: Subscribers call an operator to request a name or telephone number. The information requested is returned to the subscriber by an IVR unit, and the call is completed to the requested number.

Toll and Assist Services: Various established operator services provided by the telephone operator such as home country direct, collect call, credit card call service, booked call service, etc.

Changed Number and Interception Service: While these services are normally automated in most countries, operator "fall back" could be added for these automated services to provide better service to the subscribers.

Call Center Services: A service called to obtain information, order something, etc. normally accessed by a toll free "800" number. Using IN, these call center services can be implemented as virtual call centers, i.e., the answering operators can be combined in groups serving the call center independent of their geographical position.

Conference Call Service: The operator connects multiple party conference calls.

Absent Subscriber Service: The operator takes a message when a subscriber cannot be reached on his phone.

While the foregoing describes what are considered to be preferred example embodiments of the invention, it is understood that various modifications may be made therein and that the invention may be implemented in various forms and embodiments, and that it may be applied in numerous applications, only some of which have been described. The following claims are intended to cover all such modifications and variations which fall within the true scope of the invention.

What is claimed is:

1. A method for providing telecommunications services, comprising the steps of:

detecting a call in an intelligent network from a party requesting a telecommunications service;

processing the call and providing an intelligent network service using service logic and resources in the intelligent network domain;

the intelligent network service logic determining that the call requires the assistance of a human operator in a call center domain outside of the intelligent network domain;

the intelligent network service logic establishing a cooperative request processing session with call center service logic using a control communications path between the intelligent network domain and the call center domain;

the intelligent network service logic and the call center service logic cooperatively processing and providing service to the call using service logic and resources both in the intelligent network domain and in the call center domain during the cooperative request processing session;

the call center service logic using the cooperative request processing session to request the intelligent network service logic to connect the voice path of the call to a telephony network destination within the call center domain associated with the human operator;

the human operator using an operator workstation application to provide an operator-assisted service to the call and to return information to the call center service logic; and the call center service logic returning the information to the intelligent network service logic using the cooperative request processing session and requesting the intelligent network service logic to disconnect the voice path of the call from the human operator's telephony network destination.

2. The method in claim 1, further comprising:

the intelligent network service logic and the call center service logic cooperatively providing a service to the call after disconnection of the voice path of the call from the human operator's telephony network destination using service logic and resources both in the intelligent network domain and in the call center domain to perform a post-human operator processing operation associated with the call during the cooperative request processing session.

3. The method in claim 1, further comprising:

during the cooperative processing session, communicating an operator-initiated command to the intelligent network service logic; and the intelligent network service logic performing the operator-initiated command.

4. The method in claim 3, further comprising:

the call center service logic detecting the operator-initiated command and executing the operator command using one or more commands provided to the intelligent network service logic.

5. The method in claim 4, wherein the call center service logic executing step includes executing one or more call center service independent software building blocks to implement the operator command in a context of a call center service script composed of plural call center service independent building blocks.

6. The method in claim 1, further comprising:

the intelligent network service logic providing information regarding the human operator command processing to the call center service logic;

the call center service logic forwarding the provided information to the operator workstation application; and the operator workstation application displaying the provided information to the operator to aid the human operator in servicing the call.

7. The method in claim 1, further comprising:

the call center service logic instructing the intelligent network service logic to modify the voice path of the served call using an intelligent network switching capability either related to conferencing the call with additional call parties within or outside the call center domain or related to transferring of the call to another party within or outside of the call center domain.

8. The method in claim 1, further comprising:

the call center service logic providing billing information to the intelligent network service logic corresponding to the service performed for the call.

9. The method in claim 8, further comprising:

the intelligent network service logic using the provided billing information to determine billing rate for the voice path and potential additional charges related to use of premium charged service features.

10. A telecommunications system for providing telecommunications services to a call requesting a service having one or more service features, comprising:

a call center domain, including information processing resources, automated interactive voice response resources, operator position telephony workstations, and an Intelligent Network (IN)-enabled call center server having an automatic call distribution function and controlling call center domain resources using IN-enabled call center service logic;

an intelligent network domain, including a service switching element and a call center-enabled service control element, receiving the call, processing a service request associated with the call, and integrating one or more service features provided by the IN-enabled call center server from the call center domain in rendering the requested service;

a control communications path between the call center-enabled service control element in the intelligent network domain and the IN-enabled call center server in the call center domain; and a switched telephony network between the service switching element in the intelligent network domain and the telephony resources in the call center domain.

11. The telecommunications system in claim 10, wherein the IN-enabled call center server includes a first cooperative request processing interface for communicating request, progress, and result operations between the call center service logic and the call center-enabled intelligent network service control element.

12. The telecommunications system in claim 10, wherein the IN-enabled call center server includes a second cooperative request processing interface for communicating request, progress, and result operations between the IN-enabled call center service logic and the operator position telephony workstation.

13. The telecommunications system in claim 10, wherein the call center-enabled service control element includes a cooperative request processing interface for communicating request, progress, and result operations between the intelligent network service logic and the IN-enabled call center server.

14. The telecommunications system in claim 10, wherein the service logic in the IN-enabled call center server implements services, including cooperative request processing for the intelligent network domain and cooperative request processing for operation position telephony workstations, using service scripts built using service-independent building blocks of software program code.

15. The telecommunications system in claim 10, wherein the service logic in the call center-enabled service control element implements services, including cooperative request processing for the call center domain, using service scripts built using service-independent building blocks of software program code.

16. A method for providing telecommunications services, comprising the steps of:

detecting a call in an intelligent network from a party requesting a telecommunications service;

determining that the call requires the assistance of a human operator;

establishing a cooperative call processing session using a control communications path between the intelligent network service logic and a call center server outside of the intelligent network;

connecting the call to the human operator at the call center;

the human operator at the call center providing an operator-assisted service to the caller;

communicating an operator-initiated command from the call center server to intelligent network service logic in the intelligent network via the control communications path during the cooperative call processing session; and the intelligent network service logic performing the operator-initiated command.

17. The method in claim 16, further comprising:

executing the operator command using one or more intelligent network service logic commands.

18. The method in claim 17, wherein the executing step includes executing one or more service independent software building blocks defining the service to implement the operator command in the context of a service script composed of plural service independent building blocks.

19. The method in claim 18, further comprising:

converting the operator command into one or more intelligent network service logic requests; and transmitting the one or more operator service logic requests over the established control communications path.

20. A telecommunications system for providing telecommunications services to a party placing a call requesting a service having one or more service features, comprising:

an operator assistance call center including a call center server and one or more human operators; and an intelligent network, including a service switching element and a service control element, receiving the call, processing the service request, and integrating one or more service features provided by one of the human operators from the operator assistance call center in rendering the requested service, wherein the call center server is outside of the intelligent network and includes a cooperative call processing interface for communicating an operator-initiated command received from the operator's workstation to the intelligent network service control element, the intelligent network service logic responding to the operator-initiated command received from the cooperative call processing interface.

21. The telecommunications system in claim 20, wherein the call center server converts the operator command into one or more service feature commands recognized by service logic in the intelligent network.

22. The telecommunications system in claim 21, wherein the service logic in the intelligent network service control element implements services using service scripts, a service script including service independent building blocks of software program code, and wherein the call center server converts the operator command into one or more service scripts.

* * * * *